United States Patent
Tamai et al.

[11] 3,931,799
[45] Jan. 13, 1976

[54] ADIABATIC INTEGRAL INTAKE AND EXHAUST CONDUIT FOR INTERNAL COMBUSTION ENGINE

[75] Inventors: Hisashi Tamai, Tokyo; Soichi Nakano, Kawagoe, both of Japan

[73] Assignee: Honda Giken Kogyo Kabushiki Kaisha, Tokyo, Japan

[22] Filed: June 22, 1973

[21] Appl. No.: 372,747

[30] Foreign Application Priority Data
June 28, 1972  Japan.............................. 47-76210

[52] U.S. Cl...... 123/122 AB; 123/32 SP; 123/75 B; 123/52 M; 123/122 R
[51] Int. Cl...................... F02b 19/10; F02b 19/16
[58] Field of Search........ 123/122 A, 122 D, 122 C, 123/325 PA, 32 ST, 52 M, 122 AB, 75 B; 165/52

[56] References Cited
UNITED STATES PATENTS

| | | | |
|---|---|---|---|
| 1,170,337 | 2/1916 | Robinson | 165/52 |
| 1,289,868 | 12/1918 | Moreland | 165/52 |
| 1,313,639 | 8/1919 | Nelson | 165/52 |
| 1,777,949 | 10/1930 | Whiteman | 165/52 |
| 2,836,161 | 5/1958 | Primakoff | 123/122 A |
| 3,043,098 | 7/1962 | Hannon | 165/52 |
| 3,092,088 | 6/1963 | Goossak | 123/325 PA |
| 3,659,564 | 5/1972 | Suzuki | 123/325 PA |
| 3,741,180 | 6/1973 | Eichbaum | 123/122 A |

Primary Examiner—Charles J. Myhre
Assistant Examiner—Ronald B. Cox
Attorney, Agent, or Firm—Lyon and Lyon

[57] ABSTRACT

An intake and exhaust pipe construction for an internal combustion engine of the type having a main combustion chamber supplied with a lean mixture and an auxiliary combustion chamber supplied with a rich mixture. A spark plug ignites the rich mixture in the auxiliary chamber and the resulting torch flame passes through a torch nozzle to ignite the lean mixture in the main chamber. The auxiliary intake passage which supplies the auxiliary combustion chamber with the rich air fuel mixture is integrally formed with the exhaust passage such that a common wall extends there between. A shell is disposed about the intake and exhaust passages and spaced therefrom to form an air gap between the shell and passages. Openings are provided in the shell for allowing air flow to and from the air gap. The air flowing from the gap is directed by a conduit to the inlet opening of the intake system.

1 Claim, 1 Drawing Figure

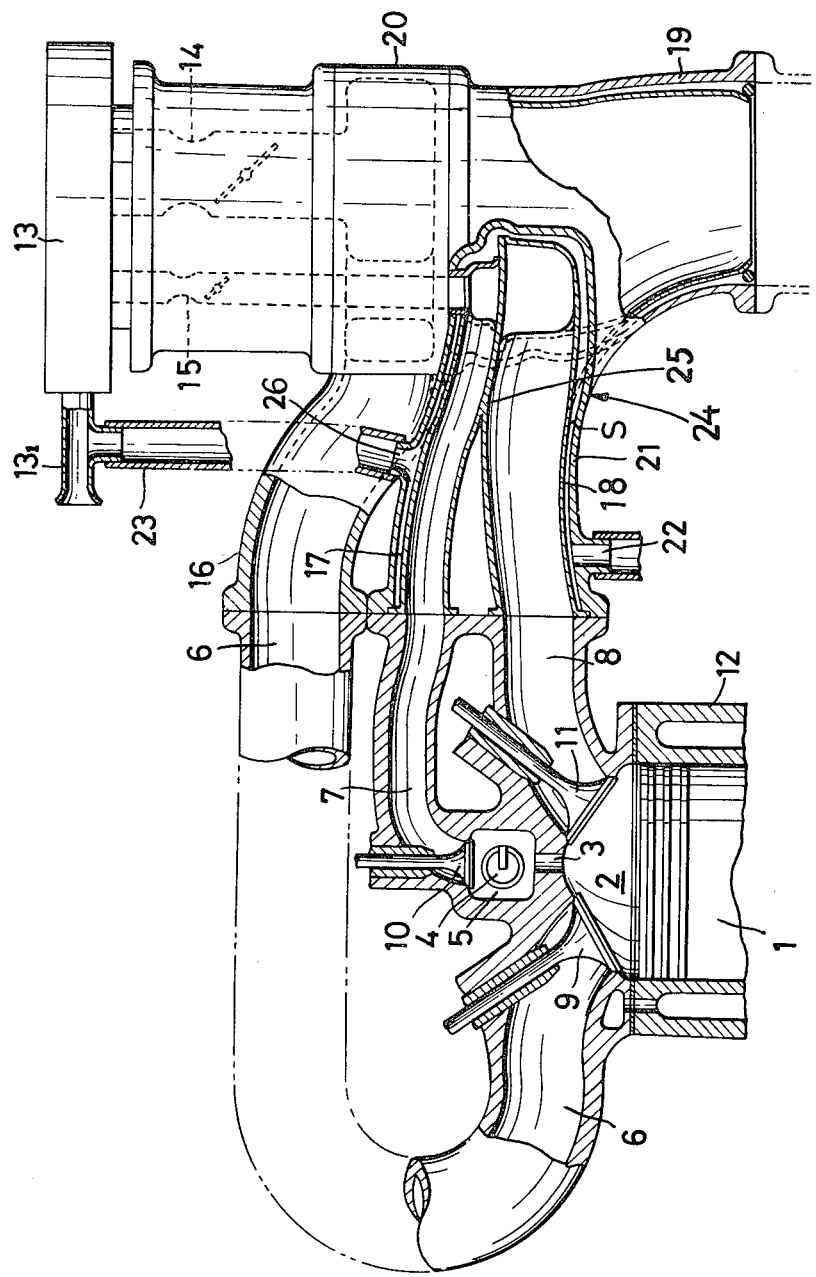

ADIABATIC INTEGRAL INTAKE AND EXHAUST CONDUIT FOR INTERNAL COMBUSTION ENGINE

This invention relates to an intake and exhaust pipe configuration for internal combustion engines of the type having a main combustion chamber, an auxiliary combustion chamber and a torch nozzle connecting the two chambers. A spark plug ignites a rich mixture in the auxiliary chamber and the torch flame passes through the torch nozzle to ignite and burn the lean mixture in the main chamber. When an engine of this type is started in a cold condition the rich mixture is cooled in the auxiliary intake passage as well as in the auxiliary combustion chamber, and the fuel in the mixture tends to separate therefrom and adhere to the wall surfaces. As a result, poor combustion occurs within the auxiliary combustion chamber resulting in a loss of fuel economy and an increase in unburned hydrocarbons which are then exhausted and become a major contributor to air pollution. To minimize the unburned hydrocarbons, it is necessary to obtain more complete combustion within the auxiliary combustion chamber which can be achieved through improved fuel vaporization.

In accordance with this invention, an intake and exhaust pipe configuration is employed which utilizes the heat in the exhaust passage to improve the vaporization of fuel mixture. Specifically, the auxiliary intake passage is integrally formed with the exhaust passage such that a thin partition separates the two passageways through which heat can flow from the exhaust gases in the exhaust passage to the incoming fuel mixture in the intake passage. Such heating vastly improves the vaporization of the mixture and thereby reduces the unburned hydrocarbons emitted to the atmosphere. However, a problem may arise with respect to overheating. While it is desirable to obtain rapid heat transfer from the exhaust passage to the intake passage, precautions must be taken to prevent excessive heat build-up and subsequent damage to the integral intake and exhaust conduit while concurrently insulating the conduit to retain heat therein. A shell is provided about the auxiliary intake and exhaust passages which forms an insulating air gap there between to aid in retaining the heat generated by the exhaust gases within the conduit. To prevent the excessive heat build-up, which might result from such insulation, air entry and exit apertures are provided within the shell to allow air to continually pass therethrough and thereby maintain the integral intake and exhaust conduit in a controlled temperature state. The heated air exiting the air gap is directed to the air cleaner of the engine thereby accelerating the heating of the main and auxiliary intake air and eliminating any need for preheating thereof.

The object of the present invention is to provide an integral intake and exhaust conduit for internal combustion engines of the type having a main and auxiliary combustion chamber which utilizes the heat from the exhaust gases to improve the vaporization of the incoming rich mixture in the auxiliary intake passage while preventing excessive heat build-up therein.

It is another object of this invention to provide an integral intake and exhaust conduit for an internal combustion engine of the type of having a main and auxiliary combustion chamber which utilizes the heat from the exhaust gases in the exhaust passage to accelerate the heating of the main and auxiliary intake air.

These and other objects and advantages of the present invention will become apparent from the following detailed description taken in conjunction with the accompanying drawings.

FIG. 1 is a sectional side view of a portion of an internal combustion engine incorporating the intake and exhaust conduit.

Referring now in detail to the drawings, the internal combustion engine is seen to have a main combustion chamber 2, a main intake passage 6 communicating therewith, an auxiliary combustion chamber 5, and an auxiliary intake passage 7 communicating with the auxiliary combustion chamber. A lean air fuel mixture is supplied to the main combustion chamber 2 through intake passage 6 and a rich air fuel mixture is supplied to the auxiliary combustion chamber 5 through the auxiliary intake passage 7. The auxiliary combustion chamber is in combination with the main combustion chamber through a torch nozzle 3. A spark plug 4 is provided in the auxiliary chamber to ignite the rich mixture therein. Flame produced thereby is injected through the torch nozzle 3 into the main combustion chamber to ignite the rich lean mixture therein. The main combustion chamber 2 is provided with a main intake valve 9 and the auxiliary combustion chamber 5 communicates with an auxiliary intake passage 7 through an auxiliary intake valve 10. An exhaust valve 11 is shown disposed across the main combustion chamber from the main intake valve 9. The exhaust valve communicates the main combustion chamber with the exhaust passage 8. The exhaust passage in turn communicates with an exhaust pipe 18 and similarly the auxiliary intake passage 7 communicates with an auxiliary intake pipe 17. The main intake passage 6 communicates with the main intake pipe 16. The intake pipe and exhaust pipes are disposed on the same side of the engine body 12 and form an integral intake and exhaust structure 24 having a partition wall 25 which extends between the auxiliary intake and exhaust pipes 17 and 18.

When the internal combustion engine above described is started from a cold condition, the heat of the exhaust gas travelling through the exhaust passage and exhaust pipe is transmitted through the partiton 25 to the rich mixture passing through the auxiliary intake pipe 17 which is immediately heated and vaporized for complete combustion. A shell 21 is disposed about the auxiliary intake and exhaust pipes to reinforce the structure and prevent loss of heat generated by the exhaust gases to the atmosphere. The shell is so disposed, as seen in the drawings, to provide an air gap "S" between the shell and the exhaust and auxiliary intake pipes thereby providing additional insulating air about the integral intake and exhaust conduit. To prevent excessive heat build-up, however, an opening 22 is provided in the shell 21 below the exhaust pipe 18 through which external air can pass into gap "S". An outlet 26 is similarly provided in shell 21 so that external air may pass into and out of the gap "S" between the shell and exhaust and auxiliary intake pipes 18 and 17 thereby maintaining the integral conduit 24 in a controlled temperature state and preventing the possibility of excessive heat build-up within the structure while preserving the heat retention properties of the integral conduit necessary for the rapid heat transfer to the incoming mixture. A conduit 23 communicates with outlet 26 and directs the air from gap "S" to the air cleaner 13 through inlet opening $13_1$; thereby utilizing the air warmed by the heat exchange within the gap "S" to accelerate the heating of the main and auxiliary intake air within the air cleaner 13. The air fuel mixture can then be further heated by the addition of an acceleration chamber 20 which is disposed directly over the exhaust manifold and transfers the heat received therefrom to the fuel mixture which flows into the chamber from carburetors 14 and 15. It should also be noted that even if the fuel mixture were to leak from the auxiliary intake pipe 17, the leakage would be returned to the intake system via conduit 23 and not exhausted to the atmosphere, thereby further reducing the polluting aspects of the exhaust gas.

In the preferred embodiment of the invention, the auxiliary intake pipe 17 and the exhaust pipe 18 are made of a low heat capacity material, for example, a thin sheet of metal while the shell 21 is made from a cast pipe. Changes and modifications may be made in carrying out the instant invention without departing from the scope and spirit thereof. Insofar as these changes and modifications are within the purview of the appended claims they are to be considered as part of the invention.

We claim:

1. In an integral intake and exhaust conduit for an internal combustion engine of the type having a main and auxiliary combustion chamber, which conduit contains an intake passage and an exhaust passage wherein a portion of said exhaust passage is integrally formed with a portion of said intake passage to define a partition therebetween, an improvement comprising: a shell disposed about said intake passage and said exhaust passage forming an air gap between said shell and said intake and exhaust passages, said shell having a first and second aperture therein, said first aperture communicating with said air gap to allow air flow therein and said second aperture communicating with said air gap to allow air flow therefrom whereby air is continually drawn into said air gap over said exhaust and intake passages and out said second aperture thereby maintaining said integral conduit in a controlled temperature state as heat is transferred from said exhaust passage to said intake passage, said first aperture being disposed within said shell below said exhaust passage and said second aperture being disposed within said shell above said intake passage and a conduit communicating said second aperture with the air intake of the internal combustion engine thereby accelerating the heating of the air entering said engine.

* * * * *

UNITED STATES PATENT AND TRADEMARK OFFICE
CERTIFICATE OF CORRECTION

PATENT NO. : 3,931,799
DATED : January 13, 1976
INVENTOR(S) : Hisashi Tamai et al It is certified that error appears in the above-identified patent and that said Letters Patent are hereby corrected as shown below:

In title, delete "ADIABATIC INTEGRAL"

Column 2, line 23, delete "rich" before "lean"

Column 2, line 35, insert --auxiliary-- between "The" and "intake"

Column 3, line 7, insert --air-- before "fuel"

Signed and Sealed this sixteenth Day of March 1976

[SEAL]

Attest:

RUTH C. MASON
Attesting Officer

C. MARSHALL DANN
Commissioner of Patents and Trademarks